(12) United States Patent
Dhawan et al.

(10) Patent No.: US 12,211,023 B2
(45) Date of Patent: Jan. 28, 2025

(54) THIRD-PARTY RETAILER DELEGATION FOR AUTOMATED-CHECKOUT RETAIL ENVIRONMENTS

(71) Applicant: Amazon Technologies, Inc., Seattle, WA (US)

(72) Inventors: Sumit Dhawan, Lynnwood, WA (US); Smita Joshi, Issaquah, WA (US); Gautham Shankar Katta, Kirkland, WA (US); Ritu Varma, Redmond, WA (US); Derek Joseph Simeone, Seattle, WA (US); Patrick Luke Mealey, Seattle, WA (US); Aravindhan Thanigachalam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 17/489,701

(22) Filed: Sep. 29, 2021

(65) Prior Publication Data
US 2023/0098243 A1    Mar. 30, 2023

(51) Int. Cl.
*G06Q 30/06*    (2023.01)
*G06Q 20/08*    (2012.01)
(Continued)

(52) U.S. Cl.
CPC .......... *G06Q 20/18* (2013.01); *G06Q 20/085* (2013.01); *G06Q 20/207* (2013.01);
(Continued)

(58) Field of Classification Search
CPC .... G06Q 20/18; G06Q 20/085; G06Q 20/207; G06Q 20/3265; G06Q 20/4016;
(Continued)

(56) References Cited

U.S. PATENT DOCUMENTS 9,117,106 B2    8/2015    Dedeoglu et al.
9,235,928 B2    1/2016    Medioni et al.
(Continued)

FOREIGN PATENT DOCUMENTS

CN    107688980 A    2/2018

OTHER PUBLICATIONS

Daskin, Amazon to sell its automated checkout technology to third-party retailers, Mar. 9, 2020, https://venturebeat.com/ai/amazon-to-sell-its-automated-checkout-technology-to-third-party-retailers/, pp. 1-11 (Year: 2020).*

(Continued)

*Primary Examiner* — John Van Bramer
(74) *Attorney, Agent, or Firm* — Lee & Hayes, P.C.

(57) ABSTRACT

Described herein are systems and techniques for implementing a third-party item tracking and payment system that enables a user to walk out without a manual checkout process. The techniques include receiving user identifying information associated with a payment account and conveying an identifier of the account to a management system of the retailer. Items, as selected by the user, are added to a virtual cart that is checked out automatically when the user exits the store and the third party system communicates the cart contents to the retailer for cost calculation and then instructs payment using the stored payment information without disrupting existing inventory and account management systems.

20 Claims, 6 Drawing Sheets

(51) Int. Cl.
- *G06Q 20/18* (2012.01)
- *G06Q 20/20* (2012.01)
- *G06Q 20/32* (2012.01)
- *G06Q 20/40* (2012.01)
- *G06Q 30/0226* (2023.01)
- *G06Q 30/0601* (2023.01)
- *G07C 9/32* (2020.01)
- *G07C 9/38* (2020.01)

(52) U.S. Cl.
CPC ..... *G06Q 20/3265* (2020.05); *G06Q 20/4016* (2013.01); *G06Q 30/0226* (2013.01); *G06Q 30/0633* (2013.01); *G07C 9/32* (2020.01); *G07C 9/38* (2020.01); *G06Q 20/203* (2013.01)

(58) Field of Classification Search
CPC ........... G06Q 30/0226; G06Q 30/0633; G06Q 20/203; G07C 9/32; G07C 9/38
See application file for complete search history.

(56) References Cited

U.S. PATENT DOCUMENTS

| | | |
|---|---|---|
| 9,473,747 B2 | 10/2016 | Kobres et al. |
| 2013/0284806 A1 | 10/2013 | Margalit |
| 2015/0220929 A1* | 8/2015 | Monk .................. G06Q 50/14 |
| | | 705/13 |
| 2018/0232796 A1 | 8/2018 | Glaser et al. |
| 2020/0160670 A1* | 5/2020 | Zalewski ............. G06Q 20/327 |
| 2020/0184442 A1* | 6/2020 | Gu ....................... G06Q 20/201 |
| 2020/0184444 A1* | 6/2020 | Gu ....................... G07G 1/0036 |
| 2021/0182921 A1 | 6/2021 | Onkels et al. |

OTHER PUBLICATIONS

Johnson, What is Just Walk Out?: How Amazon Will Take Over Physical Retail, Mar. 23, 2020, https://www.applicoinc.com/blog/what-is-just-walk-out-how-amazon-will-take-over-physical-retail/, pp. 1-6 (Year: 2020).*

Turnstiles.us, Interesting History and Uses of Turnstiles, Sep. 25, 2021, https://web.archive.org/web/20210925154515/ https://www.turnstiles.us/blog/interesting-history-and-uses-of-turnstiles/, pp. 1-5 (Year: 2021).*

PCT Search Report and Written Opinion mailed Jan. 5, 2023 for PCT application No. PCT/US2022/045212, 14 pages.

* cited by examiner

THIRD-PARTY RETAILER DELEGATION FOR AUTOMATED-CHECKOUT RETAIL ENVIRONMENTS

BACKGROUND

Traditional physical stores maintain an inventory of items in customer-accessible areas such that customers can pick items from the inventory and take them to a cashier for purchase, rental, and so forth. In other instances, meanwhile, retail environments may include sensors to generate information about events occurring in these facilities. While this information may be helpful to customers and operators of the retail environments, use of the information may be limited when some events within the environments are associated with sensor-generated information and other events are not.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
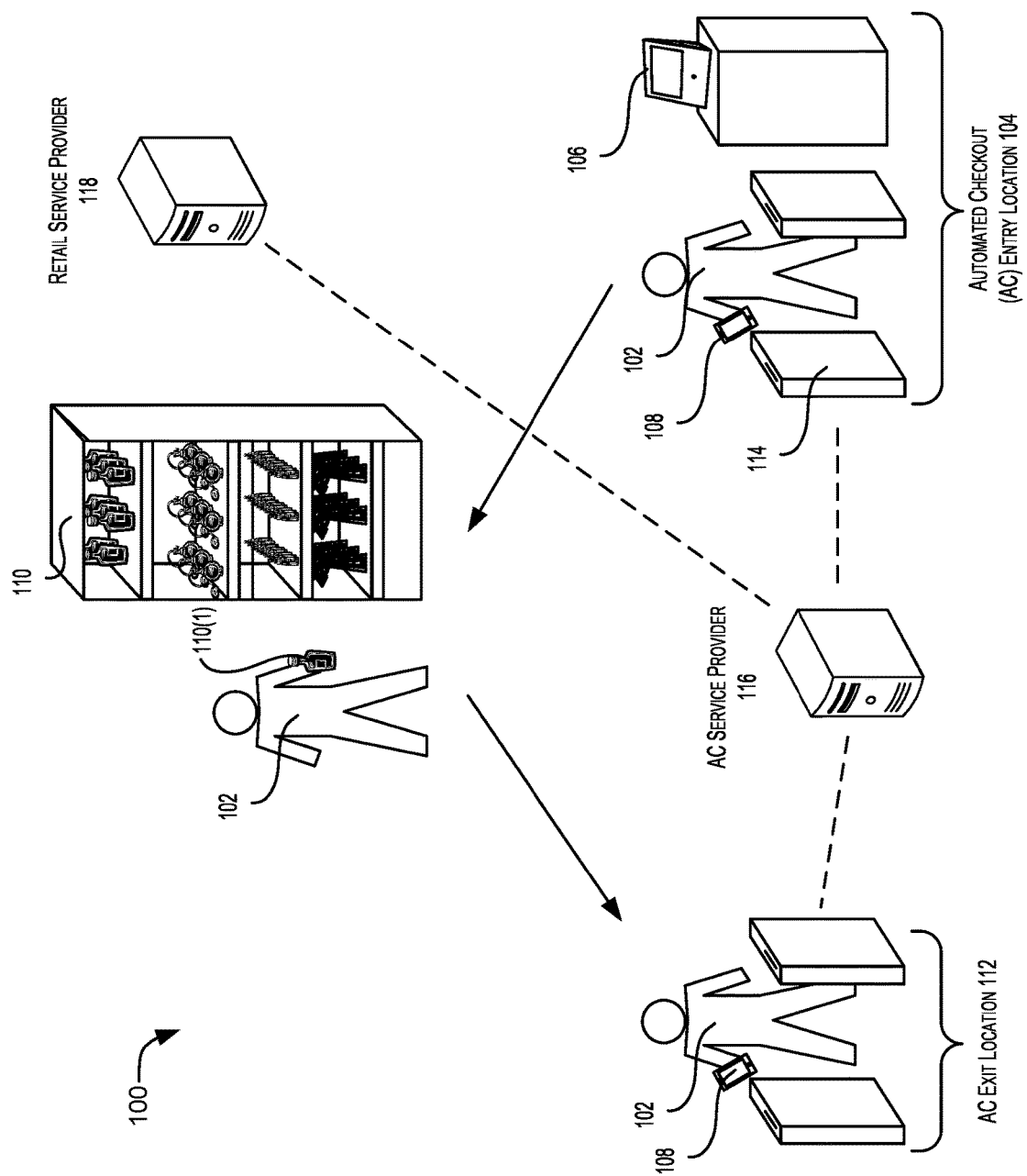
FIG. 1 illustrates an example system for automated checkout (AC) from a facility, according to at least some examples.

This disclosure describes, in part, systems for enabling physical retail stores and other facilities to implement automated-checkout techniques for customers of the stores and/or facilities. In particular, this disclosure describes systems for retrofitting an existing retail location with a hardware and software package to enable automated-checkout (AC) using a proven and tested AC system. For example, the described systems may enable a retail store to implement technology where users are able to pick items from shelves and other inventory locations and exit the store without performing manual checkout of the items, as well as technology to allow users to pay for their items using point-of-sale (POS) and/or other manual-checkout techniques. The systems described herein thus enable retail locations of all sizes and configurations to leverage AC systems without individual development and by relying on a third party package to provide the system and operations thereof while maintaining inventory and security protocols.

The AC systems described herein may be managed and operated by a separate service provider to ensure stability, security, and operability of the system, thereby enabling facilities of all sizes and sophistication to implement such systems. Operation of the AC system may include providing functionality of the AC system, such as the operation of AC devices to track items and users within the facility to identify items selected by the user. The operation of the AC system may be performed primarily by a service provider separate from the facility service provider. In this manner, the operation of the AC system is a third-party implementation to enable the techniques described herein. Additionally, the AC systems described herein provide for secure transactions by eliminating, in some examples, the need for a user to carry or present a payment card such as a credit card. Instead, a user account secured by user credentials may store the payment information and such user payment information only accessed when needed to process payments, but not transmitted across a network, thereby further improving network security by eliminating the need to transmit such data, which often involves layers of encryption and security.

In some instances, such a facility includes inventory locations housing one or more items that may be picked and/or returned by users. These inventory locations may include AC enabled inventory locations. The AC-enabled checkout locations may be associated with one or more sensors configured to generate sensor data indicative of events that occur with respect to the items housed thereupon. For example, these sensors may generate sensor data indicative of a user picking an item from the AC-enabled inventory location, returning the item to the inventory location, and/or the like. These sensors may include overhead cameras, in-shelf cameras, weight sensors, and/or any other type of sensor configured to generate sensor data indicative of user interactions with the items.

In addition to including different inventory locations, the facility may include, in some instances, one or more entry locations for entering the facility and one or more exit locations for exiting the facility. For example, the facility may include a first entry location at which an entering user provides information for identifying an account of the user, and a second entry location at which users enter without providing identifying information and instead provides only payment information. In some examples, the identifying information may be provided as payment information, such as a credit card. In some examples, the identifying information may be accessed when the user provides information, the identifying information mapped to payment information previously that may be accessed. In some examples, the identifying information may include a palm scan or other biometric information scan. For example, the first entry location may include a scanner or other imaging device at which an entering user scans or otherwise provides a unique code associated with the account of the user, such as a code displayed on a mobile device of the user. Or, the first entry location may include a microphone, camera, or other sensor that generates sensor information at the request of the user for use in identifying the account of the user. In some examples, the second entry location may include an input device for reading information from a payment card of a user, such as a credit card, debit card, prepaid card, etc. After entering the payment information, a user account may be generated and associated with the payment card that may be used to aggregate data about the user across different shopping sessions. For example, the second entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. The third entry location, meanwhile, may resemble a traditional retail facility entry location to allow users to shop or otherwise interact with items at the retail facility without needing to provide information for identifying user accounts.

Similarly, the facility may include a first exit location where an exiting user provides information for identifying an account of the exiting user, and a second exit location at which users exit without requiring a stop at a point-of-sale system for typical checkout processes. The first exit location may include, similar to the first entry location, a scanner or other imaging device at which the exiting user scans or otherwise provides a unique code associated with the account of the user, such as the code displayed on the mobile device of the user. Or, the first exit location may include a microphone, camera, or other sensor that generates sensor data at the request of the user for use in identifying the account of the exiting user. In some examples, the first exit location may not include a device to receive identifying information but may instead rely on communication from a user device indicative of when a user has exited a facility, for example based on location data from the user device. The second exit location, meanwhile, may resemble a traditional exit location at a retail facility, including an associate of the facility operating a POS device to manually checkout the exiting user.

Within this example facility, a user may choose to enter the facility using the first, AC-enabled entry location, the second AC-enabled entry location, or may choose to enter the facility using the third, non-AC-enabled entry location. If the user enters through the first entry location or the second entry location and provides information identifying an account of the user, then a system associated with the facility may generate a record indicating the presence of the user at the facility. The record may store an indication of the identity of the user as well as items selected by the user within the facility. In some examples, the first or second entry locations may enable the user to walk out without stopping at a point-of-sale location to check out with an associate of the facility and will instead be billed based on the account of the user or a payment associated with the account of the user.

In addition, sensor data generated from sensors at the facility may be used to determine current positioning of the user, which may also be stored in association with the record of the user. For example, overhead cameras, floor weight sensors, and/or the like may be used to maintain, in the record and at the knowledge and request/consent of the user, the current location of the user within the facility. Further, this sensor data (e.g., image data) may be used to locate an identifier of the user as the user navigates through the store. That is, the sensor data may be used to store an ongoing location of the identifier of the user, with the identifier comprising an anonymized alphanumeric string that does not include any personal identifiable information (PII). Further, if the user interacts within one or more items housed at an AC-enabled inventory location, the system may generate data indicative of the event. This data may be used to identify items selected by the user for checkout. In some instances, this data indicates an action taken (e.g., a pick of an item, a return of an item, etc.), an identity of the item acted upon (e.g., a bottle of ketchup, a pair of jeans, etc.), a quantity of the item involved, a location of the item (e.g., aisle, shelf, lane, etc.), and/or the like.

In some instances, the system may also generate a confidence level indicating a confidence associated with the data. If the confidence level associated with the data is greater than a threshold confidence level, then the data may be associated with an account of the user (e.g., a virtual cart of the user). For example, if the system determines, with a confidence level that is greater than the threshold, that the user picked one bottle of ketchup then one bottle of ketchup may be added to the virtual cart of the user. The cart of the user may store item information identifying each of the items selected by the user When checking out, using the automated checkout system, the cart of the user may be used to generate an order list or order data identifying the identity and quantity of items selected by the user. The order data is then conveyed from the AC system to an inventory and/or management system of the facility to determine an order cost. The management system may determine the cost by accounting for the price of the items, tax on the items, loyalty card and discount information associated with the user account, coupons, or other user- and/or location-specific cost details. In this manner, the AC system may maintain flexibility for a retailer to adjust prices, implement discounts, add coupons, and otherwise track prices for items and inventory without having to turn such information over to the service provider handling the AC system. In addition, the payment information may be kept secure as only a unique identifier associated with the user account need be transmitted between the facility system and the AC system provider. Avoiding transmitting sensitive information such as credit card details provides additional layers of security to user information.

Upon finishing his or her shopping, the user may approach the AC exit location and, in some instances, scan or otherwise provide identifying information to enable the system to identify the exiting user. After scanning his or her unique code at the AC exit gate, for instance, the user may exit the facility. The system, meanwhile, may thereafter charge an account of the identified exiting user for a cost of the items procured by the user within the facility. Of course, while the above example describes the user scanning a unique code (e.g., via a mobile device of the user), it is to be appreciated that the exiting user may be identified based on other sensor data, such as image data, voice data, location data, or the like.

While some of the examples below are described with reference to a materials handling facility (e.g., a brick-and-mortar retail store, a fulfillment center, etc.), the systems and techniques may be implemented for detecting events and interactions in any type of facility, an airport, a classroom, an outdoor environment, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

The present description provides an overall understanding of the principles of the structure, function, manufacture, and use of the systems and methods disclosed herein. One or more examples are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

Turning now to the figures, FIG. 1 illustrates an example system for automated AC from a facility 100, according to at least some examples. The system enables users, such as user 102, to enter the facility 100, pick one or more items, and exit the facility without performing a manual checkout of the items. The system includes an AC service provider 116 and a retail service provider 118. The AC service provider 116 may control operations of an AC entry location 104 and a AC exit location to identify an entry of a user into the facility 100 where an AC system may be implemented to enable the user 102 to walk out of the facility without having to stop to manually check out. The AC service provider 116 may be implemented as a third party service provider that identifies users as they enter the facility, identifies one or more items the user 102 selects within the facility 100, and generates a final cart as the user 102 exits the facility. The retail service provider 118 may include an inventory management system or other existing retail system used to track inventory, prices, and one or more user accounts associated with the facility 100. In the system of FIG. 1, the AC service provider 116 may perform various operations to generate a virtual cart of items selected by the user 102 and convey the virtual cart to the retail service provider 118 for cost determination, payment processing, and receipt generation. In this manner, the retail service provider 118 may implement the AC service provider 116, and associated system elements to identify items and place them in a virtual cart that may be checked out using traditional processes at the retail service provider 118. In this system, the AC service provider 116 may be inserted and retrofitted to numerous environments to provide a "just walk out" checkout experience and benefit without requiring re-tooling of the retail service provider 118 system.

To do so, a sensor system coupled to the facility 100 may identify a user or receive a user input and charge an account associated with the user 102 for the cost of the picked items upon exit of the user 102 from the facility 100. The AC system may be operated by a first service provider while the facility 100 is operated by a second service provider, also referred to as a retailer. In order to enable such retrofitting of facilities 100 with an AC system without requiring individual development and custom implementation at each location, which may be cost prohibitive to design and implement, the AC system described herein may be provided and operated separately to ensure smooth and accurate operation while allowing the retailer to maintain existing inventory systems and typical operations.

As illustrated, the facility 100 includes an AC entry location 104 having an gate 114 and a kiosk 106 for the user to interact with at the AC entry location 104. The AC entry location 104 enables the user to enter the store and activate or identify their user account associated with the facility 100. The gate 114 may request that entering users provide identifying information prior to entering the gate 114. In some examples, the gate 114 may be a door of the facility 100 or may be within an outer door of the facility 100. The identifying information may be provided to the gate 114 in a number of ways. In the illustrated example. the user 102 enters through the AC entry location 104 by scanning a unique code presented on a user device 108 of the user 102 at a scanning device at the gate 114. In some examples, the unique code may be generated by a mobile application hosted by the facility 100, or otherwise associated with the facility 100. The gate 114 may also identify the identifying information from the user based on a user account associated with the user device 108, based on one or more additional sensors, such as cameras, scanners, and other such devices to access unique identifying information from the user device 108. In an example, the user 102 may enter a grocery store location and open a mobile application on their user device 108 to access identifying information, such as a QR code, barcode, alphanumeric code, picture, or other identifying data that may be used to connect or associate the user device 108 with an account the user 102 has established with the grocery store. Of course, while this example describes identifying the user based on the user scanning an unique code presented on the user device 108, the system may additionally, or alternatively, identify the user based on voice data (e.g., the user stating his or her name), image data (e.g., image data of the user), password data (e.g., an alphanumeric string), and/or any other type of data. For example, in some instances the facility 100 may include a single entry location, with user identification occurring based on image data of users entering the facility 100. In these examples, those users that have consented/requested to take part in the automatic-checkout techniques may be identified, while the system may refrain from identifying other users entering the facility 100.

In some examples, the gate 114 may provide the identifying information to a service provider system, such as a management system or inventory system of the facility 100. In some examples, the gate 114 may store the identifying information in a storage system of a service provider running the AC system without communicating the identifying information to the management system until exit and checkout of the user 102.

In some examples, the user 102 may not have an account associated with the facility 100, may not have brought their user device 108, or may prefer to shop separate from their personal account. In such examples, the AC entry location 104 includes a kiosk 106 where a user may enter payment information, such as credit card information, to establish a temporary or anonymous profile for the shopping session. The profile may be associated with a unique identifier that may be used to track information regarding the user's purchases across multiple sessions by identifying the payment information and locating the corresponding account information. In some examples, the gate 114 may be equipped to read data from a credit card and may therefore be used in place of the kiosk 106. In any event, the user 102 may present their payment information to the AC entry location 104 to gain access to the facility and enable use of the AC system. In some examples, the AC system may use the identifying information received through the swipe, scan, or input of the payment information and/or user account to verify the payment method is valid. This AC system may use this identifying information to determine whether the payment instrument is valid (potentially along with whether the payment instrument is a prepaid card, such as a gift card as well as whether it has a limit of at least a pre-authorization amount applied by the AC system) and may store an indication that the user is eligible to exit the facility without performing manual checkout of the items (assuming the total of the items is less than the limit). In these instances, the system may or may not identify the user 102 but may instead simply associate the user in the facility 100 with the identified payment instrument.

In some examples, the AC system may perform a risk analysis, sometimes referred to as a fraud and abuse analysis. The risk analysis may determine a risk score for the user 102, for example indicative of a risk that the user may attempt to perpetrate a fraud or abuse the AC system. The risk analysis may be based on identifying information and/or other data gathered by the sensors of the AC system, the facility, accessible via the user account information, or entered payment information. In some examples, the AC system may perform the risk analysis and pre-authorize a predetermined amount on the payment method provided by the user in the user account. In some examples, the AC system may pre-authorize variable amounts based on the risk score determined. In some further examples, the AC system may perform a risk analysis in addition to a risk analysis performed by the facility management system. In some extreme examples, the AC system may block the gate 114 or prevent a user 102 from using the AC system in response to the risk score exceeding a predetermined threshold. For example, a user 102 may be asked to use a point-of-sale system and to interact with an associate of the facility 100 to checkout.

Returning to the example, upon the user 102 entering the facility 100 via the AC entry location 104, the AC system generates a record indicating the presence of the user 102 within the facility. In some examples, the record may be continuously or periodically updated by a location system of the AC system to generate current location data for the user 102 within the facility 100, at the prior consent of the user 102. The facility 100 may include sensors, such as overhead cameras or the like that may be used to determine the current location of the user 102.

The user 102 enters the facility and proceeds to a location 110 within the facility. The location may include one or more sensors to record events at the location 110 and thereby identify an action, such as a selection of an item from the location. For example, the location 110 may be within the field-of-view of one or more overhead, cameras, in-shelf cameras, or the like, image data from which may be used to determine the results of events that occur at the location 110. In addition, or in the alternative, the location 110 may include one or more other sensors, such as in-shelf weight sensors or the like, which may generate sensor data for identifying the results of the events.

The user 102 removes an item 110(1) from the location 110. In response, the system may use sensor data indicative of this event to determine result data associated with this event. In an example, the AC system may determine the identity of the item 110(1) selected by the user 102. In some other examples, other events may be identified to include picking, returning, moving, or other interactions. The identify may be determined by the AC system based on one or more techniques including optical recognition techniques, location-based identification, and other sensor settings used to identify an item type and quantity selected by the user 102.

After selecting the item 110(1) the user 102 may exit the facility 100 at the AC exit location 112. The AC exit location 112 may include an exit gate at which the user 102 provides identifying information for indicating to the system that the corresponding user is exiting the facility. For example, similar to the gate 114, the AC exit location 112 may enable users to scan unique codes from their mobile phones or provide any other type of identifying information. In still other instances, users may walk out and the system may identify these users via biometric-recognition techniques, in instances where the users have so requested.

In response, the system may end a shopping session of the corresponding user. In some examples, as with gate 114, the AC exit location 112 may end the shopping session based on sensor information or data indicative of the user 102 exiting the facility 100.

After ending the shopping session of the user 102, the AC system may identify items within a virtual shopping cart based on the items selected by the user 102 during the shopping session, such as item 110(1). The AC system may identify the items within the cart and convey the cart information, including the quantity and types of items to a facility system. The facility system may include the inventory management system, a payment system, or other system to manage generation of costs for customer orders.

The facility system may then process the order by first accounting for the price of the items in the order, then performing any and all adjustments and calculations necessary to produce a final total for the order. In an example, the system may generate a subtotal based on the cost of the items in the cart. The subtotal may be adjusted by accounting for taxes and discounts available. In some examples, the system may access loyalty information for the user 102 to access a loyalty program that provides discounts and apply such discounts to the subtotal. Other adjustments and changes to the price may be made by the system to produce the final total for the order to be billed to user 102.

In some examples, the facility 100 may directly bill the user based on the payment information stored in the user account hosted by the facility 100. In some examples, such as when the user 102 enters the gate 114 using a credit card but without a user account, the AC system or the facility system may perform the final payment processing to bill the user 102.

In a first example, where an AC system is fully delegated to handle interactions on behalf of the facility 100, the identifying information provided by the user 102 at the gate 114 is received by the AC system. The items selected by the user 102, such as item 110(1) are tracked and sent as cart items to the facility system upon exit from the facility 100. The cart information includes the items and quantities of items selected and also identifies the identifying information provided at the gate 114. The facility 100 may then use the identifying information to access the user account, identify the payment information entered into the user account by the user, identify any discounts such as loyalty and coupon discounts, and then bills the payment method provided in the user account.

In a second example where an AC system is partially delegated to handle transaction on behalf of the facility 100, the AC system may perform additional tasks. For example, the user 102 may provide the identifying information at the gate 114. The AC system may perform the risk analysis discussed above and may charge a pre-authorization amount to the payment device provided by the user 102. The AC system may also convey the information to the facility 100 which may perform a second risk analysis. As a result of the one or both risk analyses, the user 102 may be permitted to enter through gate 114 and shop in the facility 100. At the end of the shopping session, the AC system sends the cart to the facility system. In contrast with the first example, the facility system may then send a request to the AC system to process payment for the final total. In such examples, the payment device may not be transmitted to the facility 100 but instead the final cart total price is conveyed back to the AC system which communicates with a payment processor, or processes the payment directly, for the amount indicated by the facility system. In some examples, the pre-authorization amount may be used to accomplish the payment processing, for example by charging the order total and releasing the remainder of the pre-authorization. In an additional step, the AC system or payment processor then settles with the facility 100 such that the payment is received at the facility system from the user either directly or via the AC system.

Figure 2:
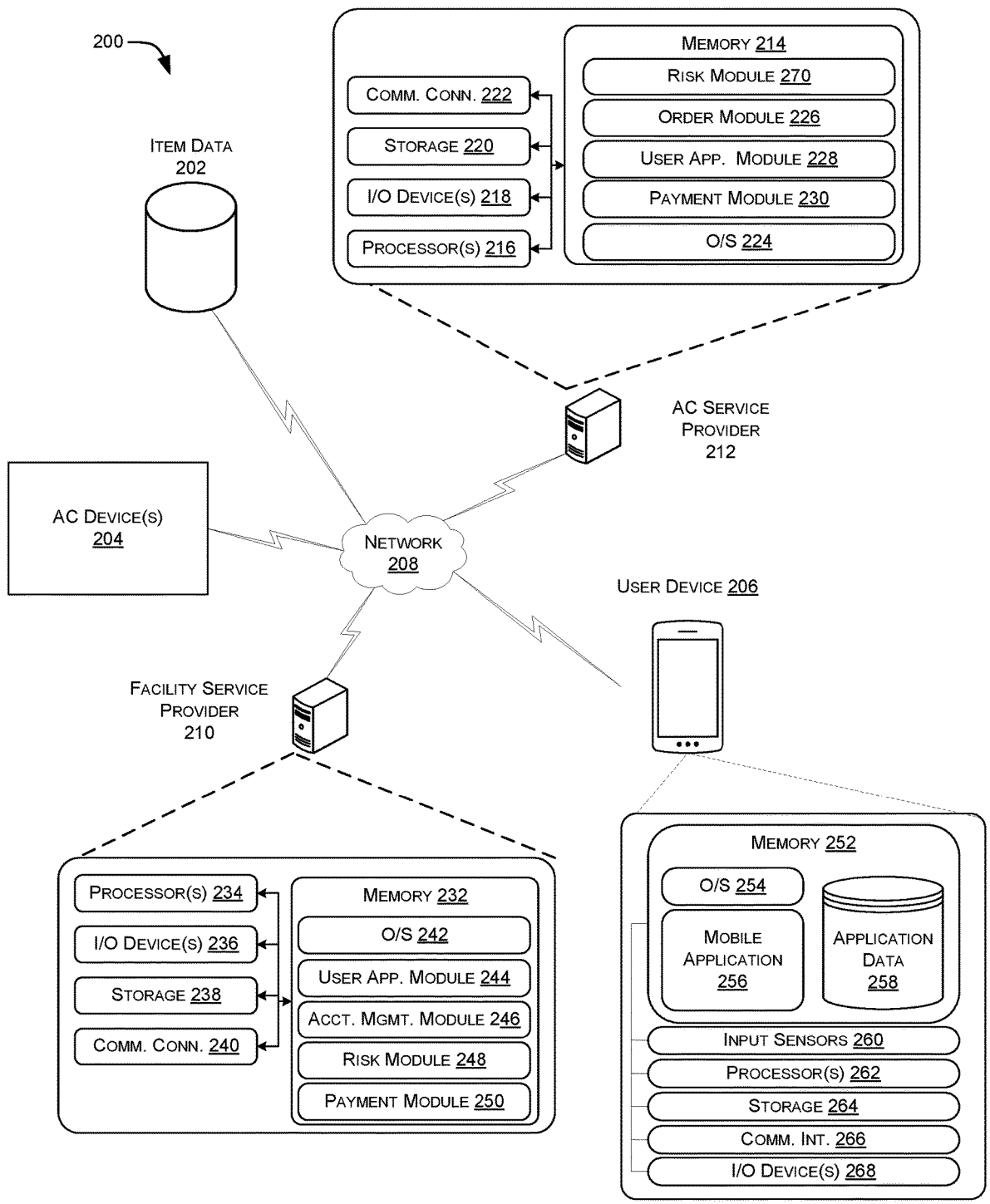
FIG. 2 illustrates an example system architecture for an AC system operated by a service provider separate from the facility operator, according to at least some examples.

FIG. 2 illustrates a system architecture 200 for an AC system operated by a service provider separate from, but in operation with, the facility operator, according to at least some examples. In the system architecture 200, a facility service provider 210 communicates with an AC service provider 212 to operate the AC system within a facility, such as facility 100 of FIG. 1. The system architecture 200 also includes item data 202 stored in a database, AC device(s) 204, and user device 206. The AC service provider 212 may be an example system to carry out the actions of the AC system described in FIG. 1. The facility service provider 210 may be part of an inventory management system of a facility, such as facility 100. The user device 206 may be an example of the user device 108. The AC device(s) 204 may include the sensor systems associated with the AC system of FIG. 1, some of which are shown and described with respect to FIG. 3 below. The user device 206 may be used by the user 102 to interact with the AC service provider, for example at gate 114 to provide payment information or identifying information. The user device 206 may also communicate with the AC device(s) 204 as well as the AC service provider 212 to enable the system to identify the items selected by the user 102 within the facility 100.

In FIG. 2, the elements of the system architecture 200 are shown in communication over network 208. The network 208 may be a communication network that enables the various elements of the system architecture 200 to communicate. In some examples, the network 208 may include one or more different networks or communication pathways. The communication network may include any one or a combination of many different types of networks, such as cable networks, the Internet, wireless networks, cellular networks, and other private and/or public networks. In addition, the communication network may comprise multiple different networks. For example, the user device 206 may utilize a wireless local area network (WLAN) to communicate with a wireless router, which may then route the communication over a public network (e.g., the Internet) to the remote computing device AC service provider and/or the facility service provider 210.

The item data 202 may include the items stored in the facility 100 and may include an inventory management system, or an inventory tracking system. In some examples, the item data 202 includes identities and identifying information for the items in the facility 100 to enable the AC system to identify the items as the user 102 interacts with them. In some examples, the item data 202 may also include price information or other such data that the facility service provider 210 may use to generate the order price for a cart of items selected by the user 102.

The facility service provider 210 includes one or more components and may include one or more computing devices. The facility service provider 210 includes a memory 232, one or more processor(s) 234, additional storage 238, communication connections 240, and input/output devices 236. The processor(s) 234 may be implemented as appropriate in hardware, computer-executable instructions, firmware or combinations thereof. Computer-executable instruction or firmware implementations of the processor(s) 234 may include computer-executable or machine executable instructions written in any suitable programming language to perform the various functions described.

The memory 232 may store program instructions that are loadable and executable on the processor(s) 234, as well as data generated during the execution of these programs. The memory 232 may be volatile (such as random access memory (RAM)) and/or non-volatile (such as read-only memory (ROM), flash memory, etc.). The facility service provider 210 may also include additional storage 238, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 232 may include multiple different types of memory, such as static random access memory (SRAM), dynamic random access memory (DRAM) or ROM. Turning to the contents of the memory 232 in more detail, the memory 232 may include an operating system 242 and one or more application programs or services for implementing the features disclosed herein including at least a user application module 244, an account management module 246, a risk module 248, and a payment module 250.

In accordance with an embodiment, the user application module 244 may provide or host a mobile application for users to interact with. The mobile application may be used to generate the identifying information described above and display the same on the user device 206. The user application module 244 may provide different functionality for the mobile application, such as to include coupons, account information, receive entered payment information, and other such interactions.

The account management module 246 may provide for management of user accounts associated with the facility 100. In an example, the user accounts may include loyalty accounts, discount codes, corporate accounts, family accounts and groups, and other such user accounts. The account management module 246 may store and access user account information such as the identifying information requested by the user application module 244 to display at the user device 206 and may also store and access the payment information entered by users.

The risk module 248 may be used by the facility service provider 210 to perform and fraud and abuse analysis for users entering the facility discussed above. In some examples, the risk module may implement machine learning techniques and methods to generate a risk score. In some examples, the risk module 248 may operate a risk analysis and output a binary output that may be used to assess whether to enable the use of the AC system by a particular user.

The payment module 250 may include information and instructions for processing and instructing payment for cart items. In some examples, the payment module 250 may calculate order totals to generate a payment amount to bill a user at the end of a shopping session. The payment module 250 may also interact with a payment processing interface or other service to perform the payment processing.

The AC service provider 212 includes components similar to those described above with respect to the facility service provider, including the communication connections 222, storage 220, input/output devices 218, and processor 216. The communications connections 222 allow the AC service provider 212 to communicate with the other components of the system. The input/output (I/O) device(s) 218 may be used to enable connection with a keyboard, a mouse, a pen, a voice input device, a touch input device, a display, speakers, a printer, etc.

The memory 214 of the AC service provider 212 may include an operating system 224, a payment module 230 similar to the payment module 250, a user application module 228 similar to the user application module 244, a risk module 270 similar to the risk module 248, and may also include an order module 226. The order module 226 may be used to communicate with the AC device(s) 204 to determine one or more items selected by a user to comprise a cart or order. The items may be identified by accessing information from the item data 202.

The user device 206 may be any suitable electronic device that is capable of providing at least a portion of the capabilities described herein. In particular, the user device 206 may be any electronic device capable of communicating with the AC service provider 212, and the other elements of the system, receiving data including payment information, and displaying information such as identifying information. The user device 206 may also communicate with a remote computing device, e.g., the facility service provider 210 and/or the AC service provider 212 to access information and/or to operate a mobile application installed on the user device 206. In an embodiment, the user device 206 may be capable of establishing a communication session with another electronic device and transmitting/receiving data from that electronic device. The user device 206 may include the ability to download and/or execute mobile applications. User device 206 may include mobile communication devices as well as personal computers and thin-client devices. In some embodiments, a user device 206 may include any portable electronic device that has a primary function related to communication. For example, the user device 206 may be a smart phone, a personal data assistant (PDA), or any other suitable handheld device. The user device 206 can be implemented as a self-contained unit with various components (e.g., input sensors, one or more processors, memory, etc.) integrated into the user device 206.

In an embodiment, the user device 206 may include a memory 252 and one or more processing units (or processor(s)) 262. The processor(s) 262 may be implemented as appropriate in hardware, computer-executable instructions, firmware or combinations thereof. Computer-executable instruction or firmware implementations of the processor(s) 262 may include computer-executable or machine executable instructions written in any suitable programming language to perform the various functions described. The user device 206 may also include one or more input sensors 260 for receiving user and/or environmental input. There may be a variety of input sensors 260 capable of detecting user or environmental input, such as an accelerometer, a camera device, a depth sensor, a microphone, a global positioning system (e.g., GPS) receiver, etc.

The memory 252 may store program instructions that are loadable and executable on the processor(s) 262, as well as data generated during the execution of these programs. Depending on the configuration and type of user device 206, the memory 252 may be volatile (such as random access memory (RAM)) and/or non-volatile (such as read-only memory (ROM), flash memory, etc.). The user device 206 may also include additional storage 264, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 252 may include multiple different types of memory, such as static random access memory (SRAM), dynamic random access memory (DRAM) or ROM. Turning to the contents of the memory 252 in more detail, the memory 252 may include an operating system 254 and one or more application programs or services for implementing the features disclosed herein including at least a mobile application 256. The memory 252 may also include application data 258, which provides information to be generated by and/or consumed by the mobile application 256. In some embodiments, the application data 258 may be stored in a database.

For the purposes of this disclosure, a mobile application may be any set of computer executable instructions installed upon, and executed from, a user device 206. In some embodiments, the mobile application 256 may cause a user device 206 to establish a communication session with the AC service provider 212 and/or the facility service provider 210 that provides backend support for the mobile application 256. The remote computing device of the AC service provider 212 and/or the facility service provider 210 may maintain account information associated with a particular user device and/or user. In some embodiments, a user may be required to log into the mobile application 256 in order to access functionality provided by the mobile application 256.

In accordance with an embodiment, the mobile application 256 may be configured to interact with the AC service provider 212, for example by outputting a display of a unique identifier for scanning at the gate 114, or otherwise communicating identifying information to the AC service provider 212. The mobile application 256 may receive output from the input sensors 260 and provide interactions to view a cart, access payment or account information and settings, and otherwise interact with the AC service provider 212. In some embodiments, the mobile application 256 may cause the user device 206 to transmit the output obtained from the input sensors 260 to the remote computing devices of the AC service provider 212 and/or the facility service provider 210, which may then perform one or more operations.

The user device 206 may also contain communications interfaces 266 that enable the user device 206 to communicate with any other suitable electronic devices. In some embodiments, the communication interface 266 may enable the user device 206 to communicate with other electronic devices on a network 208 (e.g., on a private network). For example, the user device 206 may include a Bluetooth wireless communication module, which allows it to communicate with another electronic device. The user device 206 may also include input/output (I/O) device(s) and/or ports 268, such as for enabling connection with a keyboard, a mouse, a pen, a voice input device, a touch input device, a display, speakers, a printer, etc.

In an example, the user device 206 may communicate with the AC service provider 212 as the user device 206 is brought into the facility 100 by the user 102. The user device 206 may provide identifying information via the mobile application 256 to the AC service provider 212 to initialize a shopping session. The AC service provider 212 may then interact with the AC device(s) 204, the user device 206, and the item data 202 to identify items selected by the user 102 within the facility and added to a cart. The AC service provider may generate, via the order module 226, a virtual cart of the items. The AC service provider 212 may then communicate the identifying information of the user and the virtual cart to the facility service provider 210 for determination of a cost for the virtual cart. The facility service provider 210 or the AC service provider 212 may process payment for the order after the user device 206 is carried out of the facility 100 as described above.

Figure 3:
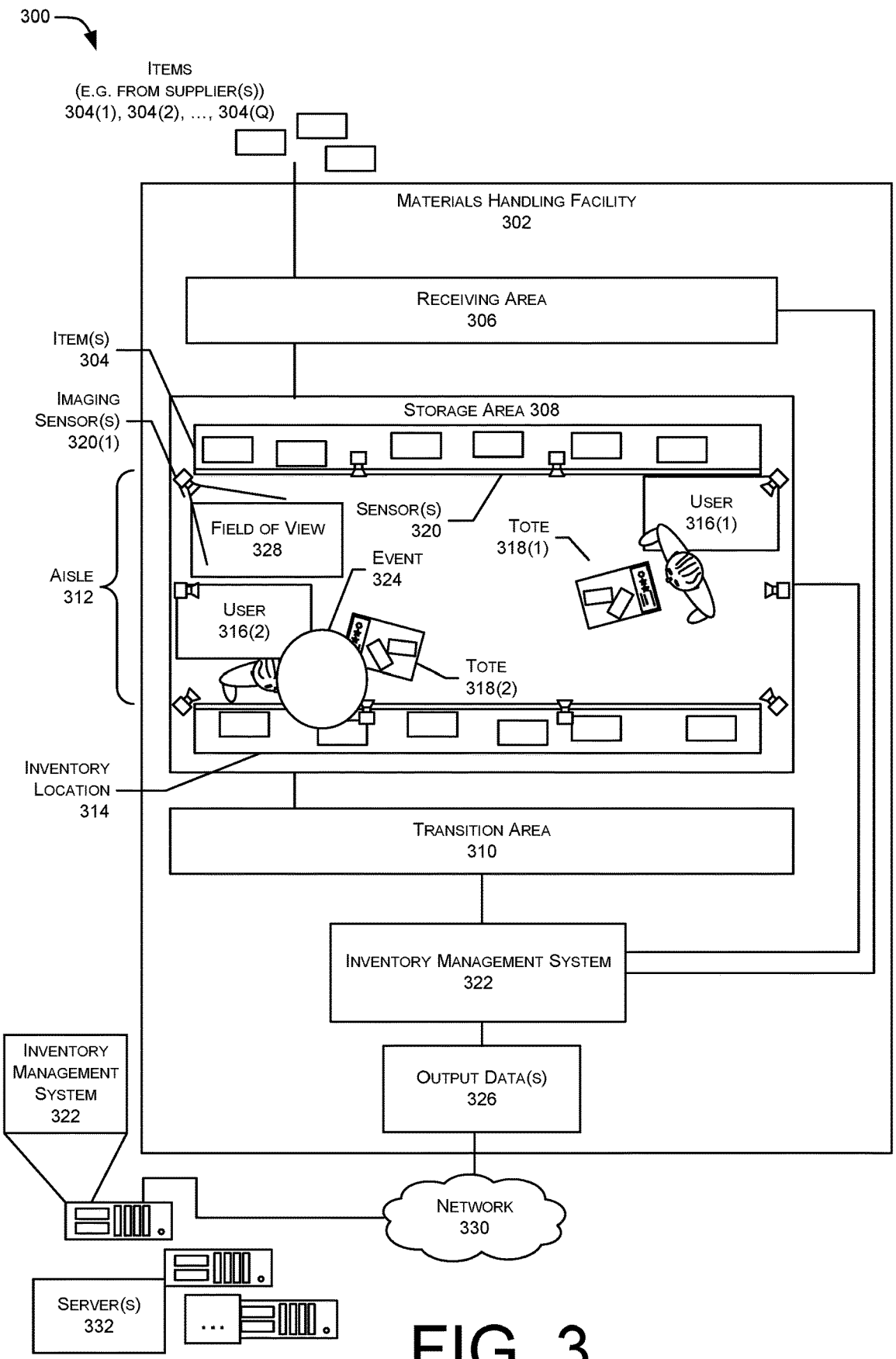
FIG. 3 illustrates a block diagram of an example materials handling facility that includes sensors and an inventory management system configured to identify items selected by a user within the facility as part of an AC system, according to at least some examples.

FIG. 3 illustrates a block diagram of an example materials handling facility that includes sensors and an inventory management system configured to identify items selected by a user within the facility as part of an AC system, according to at least some examples. Though a particular facility is described herein, the following description is merely one illustrative example of an industry and environment in which the techniques described herein may be utilized. The facility 302 comprises one or more physical structures or areas within which one or more items 304(1), 304(2), . . . , 304(Q) (generally denoted as 304) may be held. As used in this disclosure, letters in parenthesis such as "(Q)" indicate an integer result. The items 304 comprise physical goods, such as books, pharmaceuticals, repair parts, electronic gear, groceries, and so forth.

In some examples, the system described and shown with respect to FIG. 3 may represent a retrofit system including an inventory management system 322 that may be used at a facility as an AC system to track items and users and provide automated checkout as users exit the facility or move items within the facility. The system may be incorporated with an inventory system of an existing facility as well as payment systems as described above.

The facility 302 may include one or more areas designated for different functions with regard to inventory handling. In this illustration, the facility 302 includes a receiving area 306, a storage area 308, and a transition area 310. The receiving area 306 may be configured to accept items 304, such as from suppliers, for intake into the facility 302. For example, the receiving area 306 may include a loading dock at which trucks or other freight conveyances unload the items 304.

The storage area 308 is configured to store the items 304. The storage area 308 may be arranged in various physical configurations. In one implementation, the storage area 308 may include one or more aisles 312. The aisle 312 may be configured with, or defined by, inventory locations 314 on one or both sides of the aisle 312. The inventory locations 314 may include one or more of shelves, racks, cases, cabinets, bins, floor locations, or other suitable storage mechanisms for holding or storing the items 304. The inventory locations 314 may be affixed to the floor or another portion of the facility's structure, or may be movable such that the arrangements of aisles 312 may be reconfigurable. In some implementations, the inventory locations 314 may be configured to move independently of an outside operator. For example, the inventory locations 314 may comprise a rack with a power source and a motor, operable by a computing device to allow the rack to move from one location within the facility 302 to another.

One or more users 316(1), 316(2), . . . , 316(U), totes 318(1), 318(2), . . . , 318(T) (generally denoted as 318) or other material handling apparatus may move within the facility 302. For example, the users 316 may move about within the facility 302 to pick or place the items 304 in various inventory locations 314, placing them on the totes 318 for ease of transport. An individual tote 318 is configured to carry or otherwise transport one or more items 604. For example, a tote 318 may include a basket, a cart, a bag, and so forth. In other implementations, other agencies such as robots, forklifts, cranes, aerial drones, and so forth, may move about the facility 302 picking, placing, or otherwise moving the items 304.

One or more sensors 320 may be configured to acquire information in the facility 302. The sensors 320 may be examples of the AC device(s) 204 of FIG. 2 above. The sensors 320 in the facility 302 may include sensors fixed in the environment (e.g., ceiling-mounted cameras) or otherwise, such as sensors in the possession of users (e.g., mobile phones, tablets, etc.). The sensors 320 may include, but are not limited to, cameras 320(1), weight sensors, radio frequency (RF) receivers, temperature sensors, humidity sensors, vibration sensors, and so forth. The sensors 320 may be stationary or mobile, relative to the facility 302. For example, the inventory locations 314 may contain cameras 320(1) configured to acquire images of pick or placement of items 304 on shelves, of the users 316(1) and 316(2) in the facility 302, and so forth. In another example, the floor of the facility 302 may include weight sensors configured to determine a weight of the users 316 or other object thereupon.

During operation of the facility 302, the sensors 320 may be configured to provide information suitable for tracking how objects move or are selected by the users within the facility 302. For example, a series of images acquired by a camera 320(1) may indicate removal of an item 304 from a particular inventory location 314 by one of the users.

While the storage area 308 is depicted as having one or more aisles 312, inventory locations 314 storing the items 304, sensors 320, and so forth, it is understood that the receiving area 306, the transition area 310, or other areas of the facility 302 may be similarly equipped. Furthermore, the arrangement of the various areas within the facility 302 is depicted functionally rather than schematically. For example, multiple different receiving areas 306, storage areas 308, and transition areas 310 may be interspersed rather than segregated in the facility 302.

The facility 302 may include, or be coupled to, an inventory management system 322, which may perform some or all of the techniques described herein. For example, the inventory management system 322 may include the AC system including the AC service provider 212 and may maintain a virtual cart of each user within the facility. The inventory management system 322 may also store a record associated with each user indicating the identity of the user, and the location of the user.

As illustrated, the inventory management system 322 may reside at the facility 302 (e.g., as part of on-premises servers), on the servers 332 that are remote from the facility 302, or a combination thereof.

By determining the interaction of users with the items 304, the inventory management system 322 may generate output data 326. The output data 326 comprises information about the event 324. For example, where the event 324 comprises an item 304 being removed from an inventory location 314, the output data 326 may comprise an item identifier indicative of the particular item 304 that was removed from the inventory location 314 and a user identifier of a user that removed the item.

The inventory management system 322 may use one or more automated systems to generate the output data 326. For example, an artificial neural network, one or more classifiers, or other automated machine learning techniques may be used to process the sensor data from the one or more sensors 320 to generate output data 326. For example, the inventory management system 322 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 326 or the tentative results. The automated systems may generate confidence level data that provides information indicative of the accuracy or confidence that the output data 326 or the tentative data corresponds to the physical world. The inventory management system 322 may perform the actions described above, but may also be separate from an inventory tracking system of a retailer that tracks item quantities for ordering by the retailer.

The inventory management system 322 may access or generate sensor data about the facility 302 and the contents therein including the items 304, the users 316, the totes 318, and so forth. The sensor data may be acquired by one or more of the sensors 320, data provided by other systems, and so forth. For example, the sensors 320 may include cameras 320(1) configured to acquire image data of scenes in the facility 302. The image data may comprise still images, video, or a combination thereof. The image data may be processed by the inventory management system 322 to determine a location of the user 316, the tote 318, the identity of the user 316, and so forth. As used herein, the identity of the user may represent a unique identifier of the user (e.g., name, number associated with user, username, etc.), an identifier that distinguishes the user amongst other users being located with the environment, or the like.

The inventory management system 322, or systems coupled thereto, may be configured to identify the user 316, as well as to determine other candidate users. In one implementation, this determination may comprise comparing sensor data with previously stored identity data. For example, the user 316 may be identified presenting biometric or other PII data to an identity recognition system and/or a credential system, by presenting a token carrying authentication credentials, providing a fingerprint, scanning a barcode or other type of unique identifier upon entering the facility, and so forth. Identity of the user 316 may be determined before, during, or after entry to the facility 302. Determination of the user's 316 identity may comprise comparing sensor data associated with the user 316 in the facility 302 to previously stored user data.

In some instances, the inventory management system group users within the facility into respective sessions. That is, the inventory management system 322 may utilize the sensor data to determine groups of users that are effectively "together" (e.g., shopping together). In some instances, a session may include multiple users that entered the facility 302 together and, potentially, that navigate the facility together. For example, when a family of two adults and two children enter the facility together, the inventory management system may associate each user with a session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 318. Noting the child and the mother as belonging to the same session may increase the chances of successfully adding the box of cereal to the virtual shopping cart of the mother. After the box of cereal is added to the virtual shopping cart, along with any other items 304, the chopping cart may be processed for payment as described herein, to provide for seamless checkout processes enabling the family to walk directly out the exit while paying for all the items selected by the group.

Figure 4:
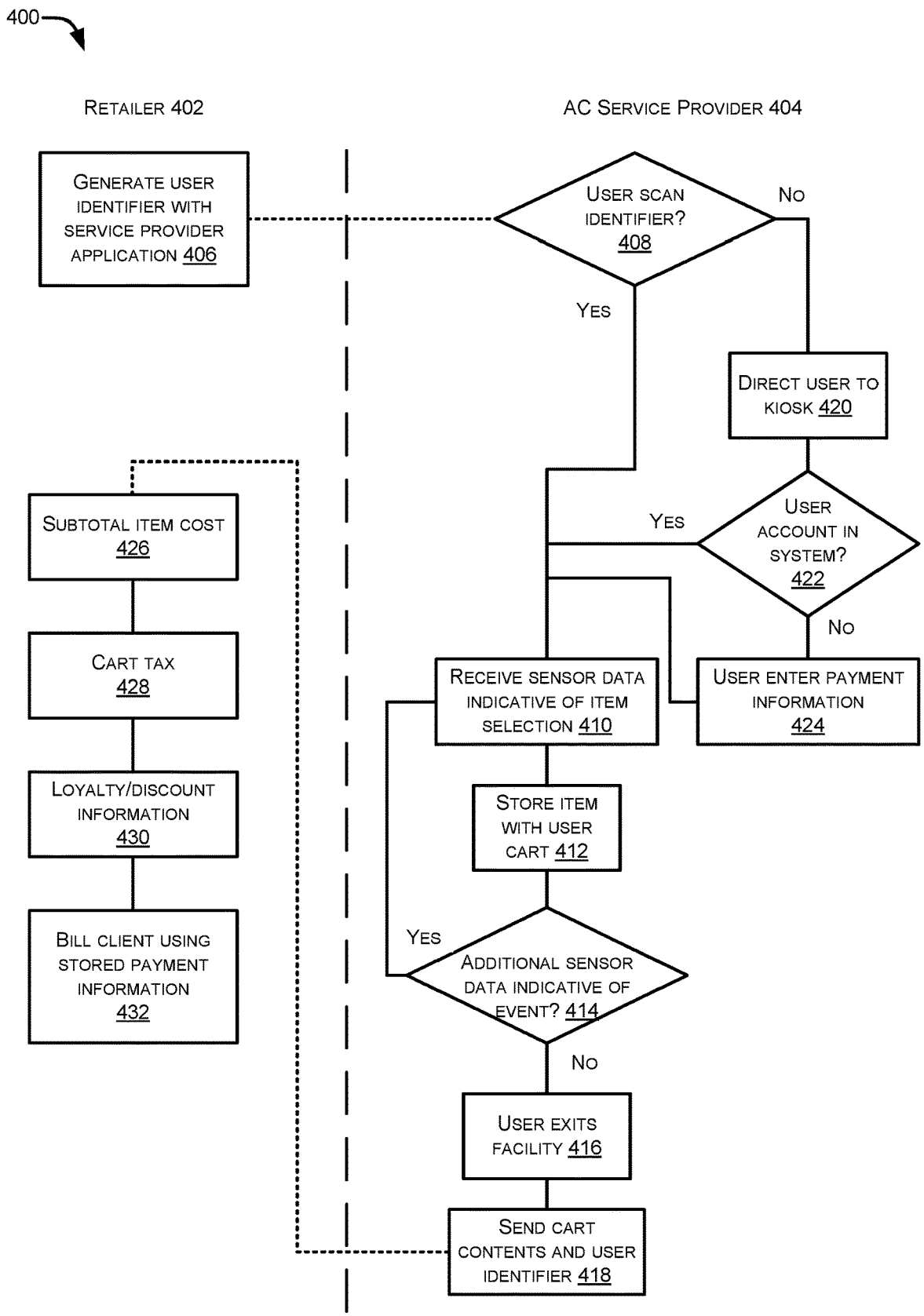
FIG. 4 illustrates an example process for full delegation of operating an AC system within a facility to enable retail transactions between a retailer and a user, according to at least some examples.
Figure 5:
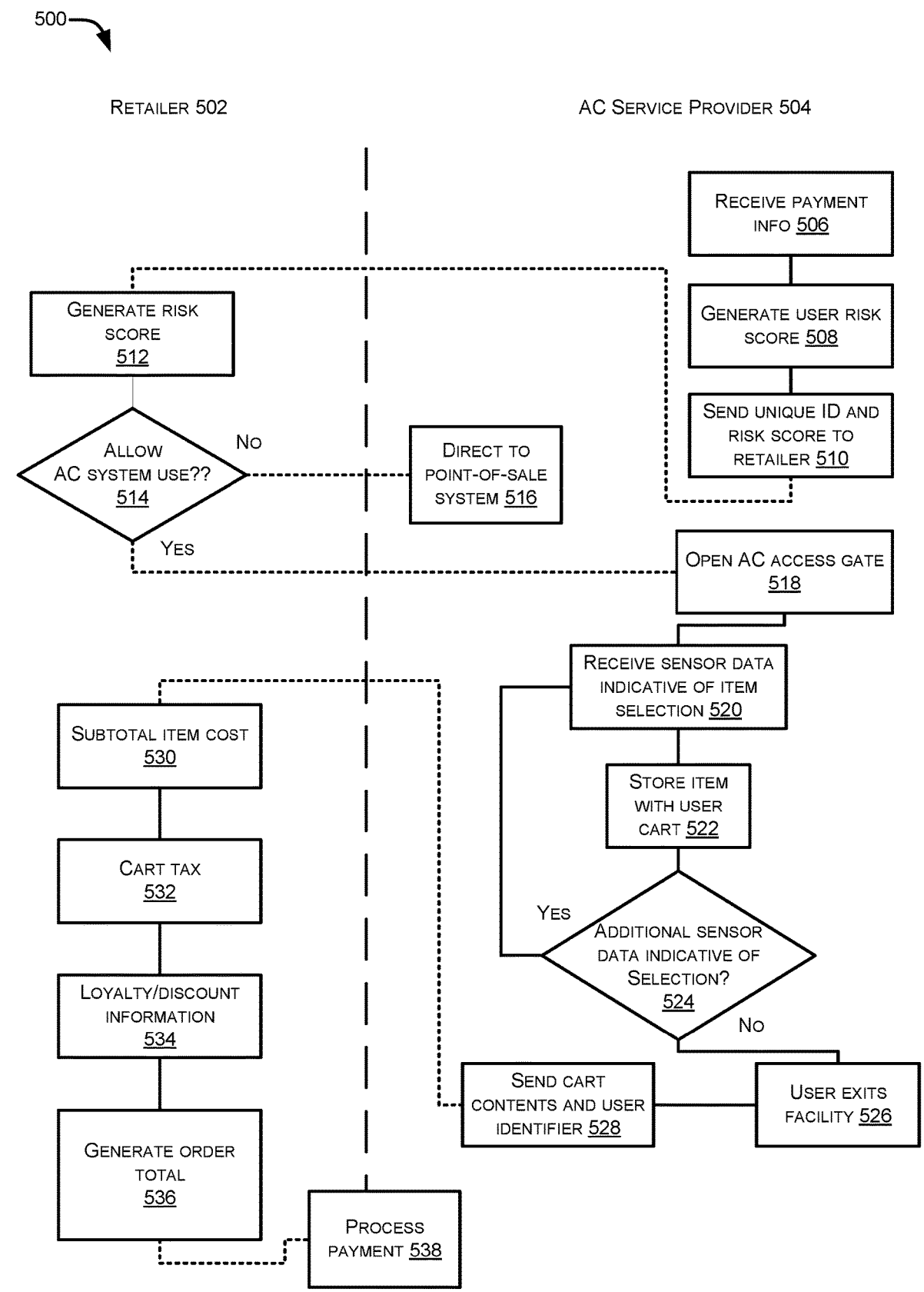
FIG. 5 illustrates an example process for partial delegation of operating an AC system within a facility to enable retail transactions between a retailer and a user, according to at least some examples.
Figure 6:
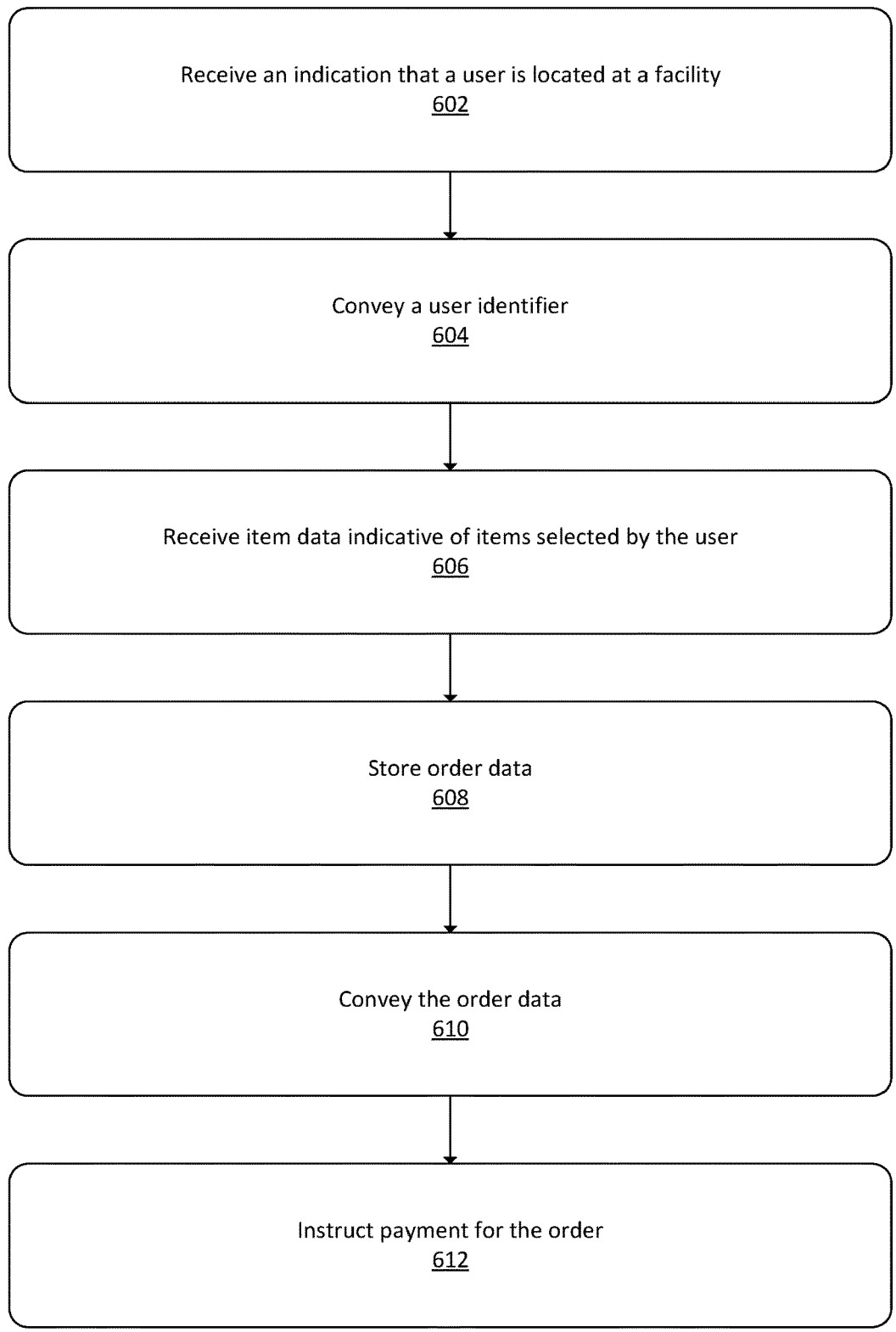
FIG. 6 illustrates an example process for processing an AC system transaction on behalf of a retailer, according to at least some examples.

FIGS. 4-6 illustrate flow diagrams of example processes 400-600 for delegating checkout operations of a retail facility to an AC system, according to at least some examples. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform functions or implement data types. The order in which the blocks are described should not be construed as a limitation, unless specifically noted. Any number of the described blocks may be combined in any order and/or in parallel to implement the process, or alternative processes, and not all the blocks need be executed. For discussion purposes, the processes are described with reference to the environments, architectures and systems described in the examples herein, such as, for example those described with respect to FIGS. 1-3, although the processes may be implemented in a wide variety of other environments, architectures and systems. The order in which the operations or steps are described is not intended to be construed as a limitation, and any number of the described operations may be combined in any order and/or in parallel to implement processes 400-600.

FIG. 4 illustrates an example process 400 for full delegation of operating an AC system within a facility to enable retail transactions between a retailer and a user, according to at least some examples. The process 400 includes information related to processes carried out by a retailer 402 as well as an AC service provider 404. The retailer 402 may be an example of the facility service provider 210 of FIG. 2. The AC service provider 404 may be an example of the AC service provider 212 of FIG. 2.

At 406, the process 400 includes generating a user identifier with a service provider application 406. The user identifier may be generated by a mobile application on a user device in communication with the retailer 402, specifically with a service provider system of the retailer 402. As described above, the user identifier may include visual markers or identifiers that may be used to identify the user account as the user enters the facility. The user identifier may include other non-visual markers such as audible markers in some examples. In some examples, the user identifier may not be generated by the facility 302 but may be generated at the AC service provider 404 and communicated to the retailer 402. As illustrated, the identifying information is communicated to the AC service provider 404 as the user device communicates the information.

At 408, the process 400 includes the service provider 404 determining whether a user entering the facility scans an identifier. The identifier may be one generated at 406 as described above. The identifier may not be visible in some examples, and may not be scanned, but may otherwise be communicated to the AC service provider 404, for example with location data tagged with user information communicated to the AC service provider 404 as the user enters the facility. In some examples, the user may be identified as entering a location based on a tracklet assigned to the user when viewed by one or more imaging devices. In such examples, the tracklet may be identified entering, exiting, or passing through a volume of interest ("VOI"), such as an entry or exit of the store, and may use the tracklet to associate with a user identifier to identify items selected by the user. In some examples, the user may approach or enter a gate of the retailer 402. When the user passes through the VOI, they may scan their identifier, which is associated with the tracklet assigned to the user. In such examples, the user may be identified as exiting and entering different regions of the retail location based on the tracklet.

When the user scans or otherwise presents the identifying information to the AC service provider 404, the process 400 proceeds to 410, where sensor data, such as from AC device(s) 204 of FIG. 2 or the sensors of FIG. 3 is communicated to the AC service provider 404, which may be an embodiment of the inventory management system 322. In response to the data, the AC service provider 404 may identify an item selected by a user and may store the item in a virtual car at 412. The virtual cart may include a listing of each item the user has removed and taken with them. In some examples, the virtual cart may include a log of all interactions or events involving the user and items in the environment, such as picking, returning, or moving the items. The virtual cart may determine items kept by the user from the log to determine a final set of items.

At 414, the process 400 includes determining whether additional sensor data is indicative of an event, such as picking items. In the event additional sensor data is available, the process 400 returns to 410 and repeats to identify all items interacted with. When no additional sensor data is indicative of events where the user interacts with an item, the process 400 proceeds to 416.

Returning to 408, when the user does not scan an identifier, or otherwise provide identifying information to the AC service provider 404, the process 400 includes directing the user to a kiosk at 420. The kiosk may be part of the entry to the facility as described with respect to FIG. 1 above. The kiosk may be included as part of a service location or a point-of-sale location of the retailer 402. In some examples, the kiosk may provide a portal for the user to enter contact information, such as an e-mail address, where a receipt from their shopping experience may be sent after completion. The kiosk may include an interface where a user may select a user account for use in the shopping session, or otherwise input payment or account information. In some examples, the kiosk may provide an option for a user to use cash with the AC system, for example by depositing an amount of cash at the kiosk to a virtual account, the virtual account either tied to the user's personal account that may be debited, or to the user identifier. Upon reaching the exit, the user may be directed to a point-of-sale kiosk to retrieve change leftover or otherwise settle the balance.

At 422, the process includes determining when the user has an account in the system. When the user has an account and merely needs to select or identify the account, for example if they left their mobile device behind, then once the account is selected by entering user credentials, the process 400 proceeds to 410 as described above.

When the user is unable to access or identify an exiting user account, the process 400 includes directing the user 424 to enter payment information that may be used to generate an account for use with the AC service provider system 404. The user may enter payment information to generate an account. In some examples, the user may enter payment information without generating an account. The AC service provider 404 may generate an identifier to associate with the payment information, such that the identifier may be communicated to the retailer 402 without transmitting the payment information directly. In some examples, the kiosk input enables the user to provide the payment information directly to the retailer, as other users have with user accounts, and then the AC service provider uses the identifier but not the payment information for the processes described herein to identify the user.

At 416, the process 400 includes determining that the user exits the facility. The determination may be made in response to the user presenting their identifying information at the exit of the facility. In some examples, the location of the user device may be used to determine when the user has exited. In some examples, sensor data, such as cameras and machine learning or object recognition techniques, may be used to identify when users exit the facility. In some examples, prior to exiting the facility, the tracklet of the user, or the user identifier, may be used to identify that the user is at or near the exit location of the retailer 402. The user may have selected one or more items that require identity verification, such as age-restricted items. In such examples, the AC service provider 404 may direct, via a gate at the exit or display, the user to discuss with a sales associate to confirm their age or identity before proceeding. In such examples, the AC service provider 404 extrapolates actions to be performed before the user exits or their order is processed based on items selected by the user. The user may not be able to exit through a gate until the conditions are met, such as age verification.

After the user exits the facility, or otherwise terminates their shopping session, the AC service provider communicates the cart items as order data and a user identifier indicating a user associated with the order data to the retailer 402 for payment processing. Because the AC service provider 404 does not have access to the user accounts in full, and the full prices and tax or other cost information, the retailer 402 performs the final processing to determine the payment amount due from the user.

At 426, the retailer creates a subtotal of the items in the cart from the order data sent from the AC service provider 404. The subtotal is then adjusted based on tax and loyalty and/or discount information at 428 and 430 before generating a final payment amount due from the user. At 432, the retailer 402 bills the user (client) based on the final payment amount determined at 426-430. The retailer 402 can charge the payment directly to the user based on the payment information accessible from the user account.

FIG. 5 illustrates an example process for partial delegation of operating an AC system within a facility to enable retail transactions between a retailer and a user, according to at least some examples. The process 500 includes information related to processes carried out by a retailer 502 as well as an AC service provider 504. The retailer 502 may be an example of the facility service provider 210 of FIG. 2. The AC service provider 504 may be an example of the AC service provider 212 of FIG. 2.

At 506, the process 500 includes the AC service provider 504 receiving payment information from a user. The payment information may be received by accessing a user account based on a user identifier received at an entrance to the facility or may be received directly, for example when a user presents their credit card to enter the gate to the facility. In any event, the payment information is accessible to the AC service provider 504 but is not available to the retailer 502. In some examples, the payment information may be used as a proxy for the user identifier, and a truncated portion of the payment information may be used as the user identifier.

After receiving the payment information, the process 500 includes generating a user risk score at 508. The risk score may be generated based on a risk analysis of the user and/or the payment information entered. The risk analysis may determine a risk score for the user, for example indicative of a risk that the user may attempt to perpetuate a fraud or abuse the AC system. The risk analysis may be based on identifying information and/or other data gathered by the sensors of the AC system, the facility, accessible via the user account information, or entered payment information. In some examples, the AC system may access a user account to identify an existing debt account with the AC service provider 504 that may be weighed as part of the risk score. In some examples, the AC system may perform the risk analysis and pre-authorize a predetermined amount on the payment method provided by the user in the user account. In some examples, the AC system may pre-authorize variable amounts based on the risk score determined. In some further examples, the AC system may perform a risk analysis in addition to a risk analysis performed by the facility management system. In some extreme examples, the AC system may block the gate or prevent a user from using the AC system in response to the risk score exceeding a predetermined threshold. For example, a user may be asked to use a point-of-sale system and to interact with an associate of the facility to checkout.

At 510, the unique identifier of the user associated with the payment information and the risk score determined by the AC service provider are conveyed to the retailer 502. The retailer may choose to perform a second risk analysis at 512. In some examples, the second risk analysis may be like the risk analysis carried out at 508. In some examples, the retailer 502 may choose to perform a risk analysis based on different criteria. In some examples, the retailer 502 may receive the risk score from the AC service provider 504 and generate a score based on that input. In some cases, the received score maybe output as the final score, in some examples it may be one input, among others, into a risk analysis to determine a risk score.

At 514, the retailer makes a determination of whether to allow the user to use the AC system. In some examples, the risk score may exceed a threshold or there may be insufficient confidence in a user account or payment method. In such examples, the process 500 may cause the AC service provider 504 or the retailer 502 to direct the user to use a traditional point-of-sale system or otherwise interact with an associate to resolve the risk score or complete their transaction in an alternative manner.

In the event the AC service provider or the retailer does not allow the user to use the AC system at step 514, the user id directed to a point of sale system at 516. The point of sale may include a kiosk or service counter where the user may be able to settle an account or otherwise resolve any issues preventing their use of the AC system.

When the retailer determines that the risk score is acceptable, such as below a threshold, or decides to disregard the risk score, then the retailer conveys a gate decision to the AC service provider 504 to open the gate at step 518. The gate decision instructs the gate, such as gate 114 to open and allow the user to enter the facility and shop using the AC system.

At 520, the process 500 includes the AC service provider 504 communicating with sensors of the AC system to receive sensor data and item data. In response to the data, the AC service provider 504 may identify an item selected by a user and may store the item in a virtual car at 522. The virtual cart may include a listing of each item the user has removed and taken with them. In some examples, the virtual cart may include a log of all interactions or events involving the user and items in the environment, such as picking, returning, or moving the items. The virtual cart may determine items kept by the user from the log to determine a final set of items.

At 524, the process 500 includes determining whether additional sensor data is indicative of an event, such as picking items. In the event additional sensor data is available, the process 500 returns to 520 and repeats to identify all items interacted with. When no additional sensor data is indicative of events where the user interacts with an item, the process 500 proceeds to 526.

At 526, the process 500 includes determining that the user exits the facility. The determination may be made in response to the user presenting their identifying information at the exit of the facility. In some examples, the location of the user device may be used to determine when the user has exited. In some examples, sensor data, such as cameras and machine learning or object recognition techniques, may be used to identify when users exit the facility.

After the user exits the facility, or otherwise terminates their shopping session, the AC service provider 504 communicates the cart items as order data and a user identifier indicating a user associated with the order data to the retailer 402 for cost processing at 528.

At 530, the retailer 502 creates a subtotal of the items in the cart from the order data sent from the AC service provider 504. The subtotal is then adjusted based on tax and loyalty and/or discount information at 532 and 534 before generating a final order total payment amount due from the user at 536. The order total is then conveyed from the retailer 502 to the AC service provider 504 at 536 so the AC service provider, which has access to the payment information, is able to process the payment at 538.

At 538, the AC service provider 504 bills the user (client) based on the final payment amount determined at 536. The step 538 is shown on both retailer 502 and the AC service provider 504 sides because it may be performed by one or both. In some examples, the AC service provider 504 triggers payment to a payment acquirer who settles with the retailer. In this example, the AC service provider 504 does not process the payment, but only provides a trigger to initiate payment processing by a payment application. In some examples, the AC service provider 504 may process the payment and act as a payment processor.

FIG. 6 illustrates an example process 600 for processing an AC system transaction on behalf of a retailer, according to at least some examples. The process 600 begins at 602 with an AC system receiving an indication that a user is located at a facility equipped with an AC system including sensors and techniques for determining which items in the facility the user interacts with. In some examples, the indication is received as the user enters and scans identifying information at an entrance of the facility. In some examples the indication may be based on a user device and a location of the user derived from the user device being within the facility.

At 604, the process 600 includes the AC system conveying a user identifier to a facility managing system. The user identifier may identify a user account or otherwise uniquely identify a user and payment method without including the payment method or payment information in the conveyed data. The user identifier may be used by the facility managing system to access a user account and identify payment information in some examples. In some cases, the user identifier may be used to track individual shopping behaviors between shopping sessions to provide a shopping history for a user that may be used as an input for a risk analysis described herein or for otherwise improving a shopping experience for the user.

At 606, the process 600 includes receiving item data indicative of items selected by the user. The item data may be received from the AC system as items are identified based on sensor data, image data, and other data from within the facility. The items are identified and associated with the user identifier and/or the user account accessed above. The items may be stored in a virtual cart that is used ultimately to determine the cost for the items at the facility management side.

At 608, the process 600 includes storing the order data at the AC system. The order data may be stored when the user completes their shopping session, such as by exiting the facility. The order data may include item identities and quantities of each item as indicated in the virtual cart for the user.

At 610, the process 600 includes conveying the order data from the AC system to the facility management system. The order data may be conveyed in its entirety to the facility management system for the system to determine a price for the items in the order and appropriately charge the user. The facility management system may determine the price based on prices stored at the system for the items, any discounts or coupons for the user, location-based taxes, and any other adjustments to price.

At 612, the process 600 includes instructing payment for the order. Instructing the payment for the order may include the facility management system directly billing the user at the payment information stored in the user account. In some examples, the AC system may be delegated to handle payment processing and payment information. In such examples, the AC system may be built with robust security features to protect the user account information and the payment information and avoid conveying such information across network communications. Instructing the payment processing may include receiving the final order total from the retailer and subsequently processing the payment via the AC system based on payment information stored thereon associated with the user.

In some examples, the process 600 may include additional steps, for example to receive contact information, such as an email address from the user. The contact information may be entered by the user at the entrance, may be accessed from a user account associated with a user identifier scanned at the entrance, or otherwise available based on the user identifier. The contact information may be used to provide receipts or order summary information for the shopping trip.

Additionally, the process 600 may include one or more risk assessment steps, such as described above with respect to FIG. 5. The AC service provider may perform a risk assessment in response to the indication that the user is at the facility and may condition entrance to the facility on the risk score. In some examples, the risk score may be conveyed with the user identifier to the retailer, who may perform a separate risk analysis of the user, as described above.

While the foregoing is described with respect to the specific examples, it is to be understood that the scope of the description is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
an automated checkout system operated by first entity separate from a retailer at a retail location, the automated checkout system comprising:
a checkout computing system;
an entry device; and
a sensor system configured at least to detect removal of items by a user within the retail location;
one or more processors; and
one or more computer-readable media storing instructions that, when executed by the one or more processors, cause the one or more processors to perform operations comprising:
receiving, at the checkout computing system, user information entered at the entry device, the user information associated with user payment information;
conveying a user identifier to a retailer computing system, the user identifier based on the user information;
instructing the entry device to allow access to a user based at least in part on the user information;
receiving, from the sensor system, item identifier data indicative of items removed by the user;
storing, by the checkout computing system and in a virtual cart associated with the user identifier, order data associated with the item identifier data;
receiving, from the sensor system, data indicative of the user exiting the retail location;
in response to receiving the data indicative of the user exiting the retail location, conveying the order data from the automated checkout system to the retailer computing system, wherein the automated checkout system is void of user account data stored at the retail location, item cost data stored at the retail location, and at least one of tax data stored at the retail location, and discount information data stored at the retail location, such that the retailer determines an order cost for the user based at least in part on the user account data, the item cost data, and at least one of the tax data, and the discount information data;
receiving, at the checkout computing system and from the retailer computing system, the order cost associated with the order data; and triggering, in response to the order cost, a payment via the user payment information, wherein the user payment information is stored by the checkout computing system but not available to the retailer computing system.

2. The system of claim 1, wherein the operations further comprise determining, based at least in part on the user information, a risk score indicative of a risk associated with the user, wherein conveying the user identifier to the retailer computing system is based at least in part on the risk score.

3. The system of claim 2, wherein instructing the entry device to allow access to the user is further based on an instruction from the retailer and the risk score.

4. The system of claim 1, wherein triggering the payment comprises instructing a payment processor application to process an order amount determined by the retailer for items described by the item identifier data.

5. A method comprising:
receiving, user information at an entry gate of an automated checkout system, the entry gate disposed at a sales facility;
receiving, by a first computing system of the automated checkout system, the user information, wherein the first computing system of the automated checkout system is operated by a first service provider and the sales facility is operated by a second service provide, the first service provider separate from the second service provider;
conveying a user identifier from the first computing system to the second computing system of the second service provider and in response to receiving the user information;
instructing the entry gate to allow access to a user based at least in part on the user information;
receiving, at the first computing system, first sensor data from a sensor system of the automated checkout system;
determining, item identifier data indicative of one or more items picked up by the user at the first computing system and based at least in part on the first sensor data;
storing, by the first computing system the item identifier data in a virtual cart associated with the user identifier;
receiving, at the first computing system, second sensor data from the sensor system;
determining that the user has exited the sales facility based at least in part on the second sensor data;
in response to determining that the user has exited the sales facility, conveying the virtual cart from the first computing system to the second computing system, wherein the first computing system is void of user account data stored at the second computing system, item cost data stored at the second computing system, and at least one of tax data stored at the second computing system, and discount information data stored at the second computing device such that the second computing system determines an order cost for the virtual cart based at least in part on the user account data, the item cost data, and at least one of the tax data, and the discount information data;
receiving, at the first computing system and from the second computing system, the order cost associated with the virtual cart; and
causing, in response to the order cost, the first computing system to charge a payment instrument associated with the user, wherein the payment instrument is stored by the first service provider but not available to the second service provider.

6. The method of claim 5, comprising receiving at the first computing system a unique identifier associated with a user account stored with the second computing system.

7. The method of claim 6, wherein the unique identifier is encrypted and includes identifying information to identify the user between sessions without including secure payment information.

8. The method of claim 5, comprising receiving a user specific indicator at the entry gate, the user specific indicator generated by a mobile application hosted by the second computing system.

9. The method of claim 8, wherein the user specific indicator is linked to a user account associated with the second computing system, the user account including payment information and customer information.

10. The method of claim 5, comprising receiving payment information by the first computing system at the entry gate and wherein the method further comprises generating, by the first computing system, the user identifier in response to receiving the payment information.

11. The method of claim 10, further comprising:
determining, at the first computing system, a risk score indicative of a risk associated with the user in response to receiving the payment information; and
instructing the entry gate to allow access to the user based at least in part on the risk score.

12. The method of claim 11, wherein instructing the entry gate to allow access to the user is in response to receiving instructions from the second computing system after conveying the user identifier and the risk score to the second computing system.

13. The method of claim 5, wherein instructing payment comprises receiving a payment amount from the second computing system based at least in part on the virtual cart and instructing, by the first computing system, payment for the payment amount from a stored payment device of the user to the second computing system.

14. The method of claim 5, comprising receiving payment information by the first computing system at the entry gate and wherein the method further comprises generating, by the first computing system, the user identifier in response to receiving the payment information.

15. The method of claim 14, further comprising:
determining, at the first computing system, a risk score indicative of a risk associated with the user in response to receiving the payment information;
instructing the entry gate to not open based at least in part on the risk score; and
in response to instructing the entry gate to not open based on the risk score, directing the user to a point of sale system operated by the second service provider.

16. The method of claim 5, wherein the second computing system is remote from the sales facility.

17. A method comprising:
receiving, user information at an entry gate of an automated checkout system, the entry gate disposed at a sales facility;
receiving, by a first computing system of the automated checkout system, the user information, wherein the first computing system of the automated checkout system is operated by a first service provider and the sales facility is operated by a second service provide, the first service provider separate from the second service provider;
determining, by the first service provider and based at least in part on the user information, a risk score associated with the user;

conveying a user identifier from the first computing system to the second computing system associated with the second service provider, the risk score and the user identifier separate from payment information describing a stored payment method associated with the user identifier, wherein the payment information is stored at the first computing system of the first service provider and is not accessible by the second computing system;

receiving a gate decision from the second computing system instructing opening of the entry gate at the entrance to the sales facility;

receiving, at the first computing system, first sensor data from a sensor system of the automated checkout system;

determining, item identifier data indicative of one or more items picked up by the user at the first computing system and based at least in part on the first sensor data;

receiving, at the first computing system, second sensor data from the sensor system;

determining that the user has exited the sales facility based at least in part on the second sensor data;

in response to determining that the user has exited the sales facility, conveying the virtual cart from the first computing system to the second computing system, wherein the first computing system is void of user account data stored at the second computing system, item cost data stored at the second computing system, and at least one of tax data stored at the second computing system, and discount information data stored at the second computing device such that the second computing system determines an order cost for the user based at least in part on the user account data, the item cost data, and at least one of the tax data, and the discount information data;

receiving, by the first computing device, the order cost for the virtual cart from the second computing system; and instructing, by the first computing device, payment for the order cost using the payment information.

18. The method of claim 17, wherein the payment information is received at a kiosk of the automated checkout system at the entrance of the sales facility.

19. The method of claim 17, wherein the user identifier is linked to the payment information and is stored to identify the user across multiple sessions.

20. The method of claim 17, wherein instructing the payment for the order cost using the payment information comprises instructing, by the first computing device, to access a user account associated with the automated checkout system.

* * * * *